United States Patent [19]

Garrett et al.

[11] Patent Number: 5,557,728
[45] Date of Patent: Sep. 17, 1996

[54] AUTOMATED IMAGE RETRIEVAL AND SCALING INTO WINDOWED DISPLAYS

[75] Inventors: Michael J. Garrett, Otterbourne; Andrew Key; Kenneth Morse, both of Southampton, all of England

[73] Assignee: International Business Machines Corporation, Armonk, N.Y.

[21] Appl. No.: 543,617

[22] Filed: Nov. 22, 1994

Related U.S. Application Data

[63] Continuation of Ser. No. 929,062, Aug. 12, 1992, abandoned.

[30]     Foreign Application Priority Data

Aug. 15, 1991 [GB] United Kingdom ............... 91307559

[51] Int. Cl.[6] .................................................. G06T 3/40
[52] U.S. Cl. ........................................ 395/157; 395/139
[58] Field of Search ............................ 395/102, 117, 395/118, 119, 139, 136, 149, 157, 153, 115

[56]            References Cited

U.S. PATENT DOCUMENTS

| | | | |
|---|---|---|---|
| 4,642,621 | 2/1987 | Nemoto et al. | 345/118 |
| 4,825,365 | 4/1989 | Inoue | 395/157 X |
| 4,829,453 | 5/1989 | Katsuta et al. | 382/305 |
| 4,870,599 | 9/1989 | Hempel et al. | 345/118 X |
| 4,872,064 | 10/1989 | Tutt et al. | 395/139 X |
| 4,893,258 | 1/1990 | Sakuragi | 395/139 |
| 4,928,252 | 5/1990 | Gabbe et al. | 395/102 |
| 4,951,231 | 8/1990 | Dickenson et al. | 395/136 |
| 5,027,110 | 1/1991 | Chang et al. | 345/131 |
| 5,053,885 | 10/1991 | Telle | 358/449 |
| 5,122,973 | 6/1992 | Venner et al. | 395/117 |
| 5,199,102 | 3/1993 | Sakuragi | 395/139 |
| 5,204,959 | 4/1993 | Sakuragi | 395/102 X |
| 5,241,671 | 8/1993 | Reed et al. | 395/600 |
| 5,274,759 | 12/1993 | Yoshioka | 395/139 X |
| 5,333,255 | 7/1994 | Demouth | 395/157 |
| 5,335,296 | 8/1994 | Larkin et al. | 395/139 X |
| 5,375,199 | 12/1994 | Harrow et al. | 395/159 |

FOREIGN PATENT DOCUMENTS

| | | | |
|---|---|---|---|
| 3940051 | 7/1990 | Germany | H04N 1/387 |

OTHER PUBLICATIONS

Goodman, The Complete Hypercard Handbook, 1987, pp. 32–33, 46–55.

"Method for Displaying Directories of Images", IBM Technical Disclosure Bulletin, vol. 30, No. 11, Apr. 1988, p. 257.

*Primary Examiner*—Heather R. Herndon
*Assistant Examiner*—Anton W. Fetting
*Attorney, Agent, or Firm*—Wayne P. Bailey; Paul S. Drake; Volel Emile

[57]            ABSTRACT

A system and method are provided for processing data representing stored images so that a set of such stored images can be represented simultaneously on an output medium having a specified output area in such a way that more effective use of the output area is made than previously possible with prior art techniques. Typically the set of stored images to be represented will result from an image database search and the output area will be a display screen of a monitor.

11 Claims, 3 Drawing Sheets

AUTOMATED IMAGE RETRIEVAL AND SCALING INTO WINDOWED DISPLAYS

This a continuation of application Ser. No. 07/929,062 filed Aug. 12, 1992 abandoned.

TECHNICAL FIELD

This invention relates to a system and method for processing data representing stored images.

BACKGROUND OF THE INVENTION

Electronic imaging has become a major field of development and large numbers of electronically generated images are being produced in many sectors of life, such as engineering, design, security and education. These images are created in a variety of different ways, for example by use of computer generating techniques or through reproduction of images detected by scanning devices. The development of scanning devices in particular has enabled large quantities of detailed image data to be formed.

Such electronically generated images can be stored as data files for future retrieval and manipulation. However, as the number of these images and the size of the databases holding the associated data files has increased problems have arisen in enabling a user to quickly and easily access and manipulate these data files.

Several prior art techniques exist for retrieving data representing stored images. One such system allows the user to append an alphanumeric identifier to data files at the time the data is stored thus enabling later access to the information. However, although these identifiers can be descriptive, difficulties can arise when accessing the file contents, particularly for a user who did not originally input the image data and does not know what the identifier is, or for a user who has simply forgotten what the identifier is. For a user in this situation the only option would be to examine the contents of each file, one by one, until the desired image has been located.

Improvements to the above system have been made, allowing the user to append several alphanumeric identifiers to the data file when it is stored in the database, instead of just one. Of these identifiers one would be the actual file name and the remaining would be descriptive keywords to facilitate searching for the file at a later date. The user can then search the database for a desired image by entering a selection of keywords which he considers to describe the image he wishes to retrieve. These keywords are used by the database system as search words, the data files stored therein being searched to see if they have any of those keywords appended to them. Once the database has been searched the user will then be presented with a list of file names representing those data files which had one or more of the selected keywords appended to them. From these file names the user can pick one or more for further manipulation or can perform further searching, if for example the list of file names is too large or if the desired data file is not present within the list. However a user may still face the same problem as above in that the file names may be meaningless to him, and he would then have to resort to looking at the corresponding images one by one.

"Turn-page" systems access image data, at the user's command, one page at a time. For example, a file may contain data pertaining to several images. In order for the user to access the correct image for subsequent data handling (e.g. sending to a printer), each page of the file is output sequentially to screen, and the user selects the correct image for printing. Such systems require that the full image data for each page be manipulated and presented on screen one page at a time; hence, a great deal of time is spent transferring superfluous data (that is pages of the file that the user does not want to print) through the system.

In European patent application EP 0,415,529 an information handling system is described in which data is input into the system, for example via a scanner, and is stored in an image store. Compression logic then reduces the data in the image store to form a scaled or iconic image of the original full image data, which is stored in bit map form in the system in association with data for the full image. The iconic image preserves the salient features of the full image but without retaining unnecessarily fine detail, and acts as a pictorial tag for the full image, replacing the file names of the earlier systems. If a user opens a file then iconic images associated with each full image contained within that file appear on the monitor screen together. This icon system can also be incorporated with systems that search on keywords as described above, the result of such a search being that a group of icons appears on the screen rather than a list of file names. The user can then select, for example using a mouse and a cursor, a particular iconic image and thus access the associated full image for viewing on the display. This approach has proved to be more advantageous than the other described techniques since identification is made by looking at a fixed reduced size image of the original and not from a file name which may not have a great deal of meaning to the user.

However the above approach of creating icons does have disadvantages. Since icons only contain the salient features of an original image, and none of the fine detail, they are rather coarse and so do not lend themselves to quality compression, particularly in color. Also the icons cannot be decompressed to produce a more detailed representation since they contain no information that would enable such decompression. Thus icons, once generated, are of a fixed size. This inflexibility means that, in general, a set of icons will not be ideal for display, there being either too many to enable all the icons within the set to be displayed at once, or at the other extreme there being only a few in which case a large proportion of the display area is left unused.

SUMMARY OF THE INVENTION

It is an object of the present invention to provide a system and method for processing data representing stored images so that a set of said stored images can be represented simultaneously on an output medium having a specified area in such a way that more effective use of the output area is made.

Accordingly the present invention provides a system for processing data representing stored images so that a set of said stored images can be represented simultaneously on an output medium having a specified output area, characterized by: a divider for dividing said output area into a number of regions dependent on the number of stored images in said set; an assignment device for associating each of the stored images in said set with an associated one of said regions; a scaling means for scaling a stored image from said set such that when that image is represented on said output medium, that image will occupy a selected area within the associated region of said output area; whereby said set of images can be represented on said output medium simultaneously in a way that allows the whole output area to be utilized, irrespective of the number of stored images in said set.

The system of the present invention can divide the output area into any number of regions greater than or equal to the number of stored images in said set. However in the preferred embodiment the divider will divide the output area into a number of regions equal to the number of stored images in said set, as long as this does not involve producing regions having an aspect ratio unacceptably different to that of the images to be reproduced in said regions. When the number of regions is equal to the number of stored images in said set, the assignment device will associate each stored image in said set with one of said regions so that all regions are associated with an image. Further said scaling means can be arranged to scale the stored images so that said images occupy substantially the whole of their associated regions, so that substantially the whole of the output area is employed to represent the stored images in said set.

The system of the present invention can be operated with or without an upper limit being placed on the number of regions able to be created by said divider. However in the preferred embodiment the number of regions created by said divider cannot exceed a predetermined number, and if the number of stored images in said set exceeds that predetermined number, then said assignment device is adapted to assign said stored images to successive sets of regions, each such set containing no more than said predetermined number of regions. These sets are then represented on the output area one set at a time.

The system of the present invention can operate on image data obtained from a variety of sources. However in the preferred embodiment the data representing stored images is obtained as a result of an image database search.

The output medium employed in the system of the present invention may be a display screen of a monitor, a page of a printer, or any number of other output media suitable for reproduction of images. However in the preferred embodiment the output medium is a display screen of a monitor.

The present invention also provides a method of processing data representing stored images to enable a set of said stored images to be represented simultaneously on an output medium having a specified output area, characterized by the steps of: dividing said output area into a number of regions dependent on the number of stored images in said set; associating each of the stored images in said set with an associated one of said regions; scaling a stored image from said set such that when that image is represented on said output medium, that image will occupy a selected area within the associated region of said output area; and transferring the scaled stored image to said output medium for representation in said associated region of said output area; whereby said set of images can be represented on said output medium simultaneously in a way that allows the whole output area to be utilized, irrespective of the number of stored images in said set.

The present invention will find application in many areas involving the storage and retrieval of images, for example photography, museums, fine art collections, and newspaper and magazine publishers. The present invention also facilitates the sending and viewing of scaled down images over networks, with the inherent reduction in bandwidth associated with such scaled images.

The present invention will be described further, by way of example only, with reference to an embodiment thereof as illustrated in the accompanying drawings, in which:

DETAILED DESCRIPTION OF THE PREFERRED EMBODIMENT

In a typical environment a system in accordance with the present invention could be used to process data representing a set of images resulting from a standard keyword search on an image database incorporating a computer terminal to enable user interaction.

As the number of electronic images being produced has increased the databases used to store them have had to be adapted to accommodate that increase. In most modern environments it has ceased to be practical to store every image in its full non-compressed form as much expensive memory space is required. Typically images are compressed in a reversible manner using any of a number of known compression algorithms and are then stored in their compressed form as a data file with associated alphanumeric identifiers. The technique involved in a typical compression algorithm will be described with reference to FIG. 2 which illustrates one compression step in detail.

Figure 2:
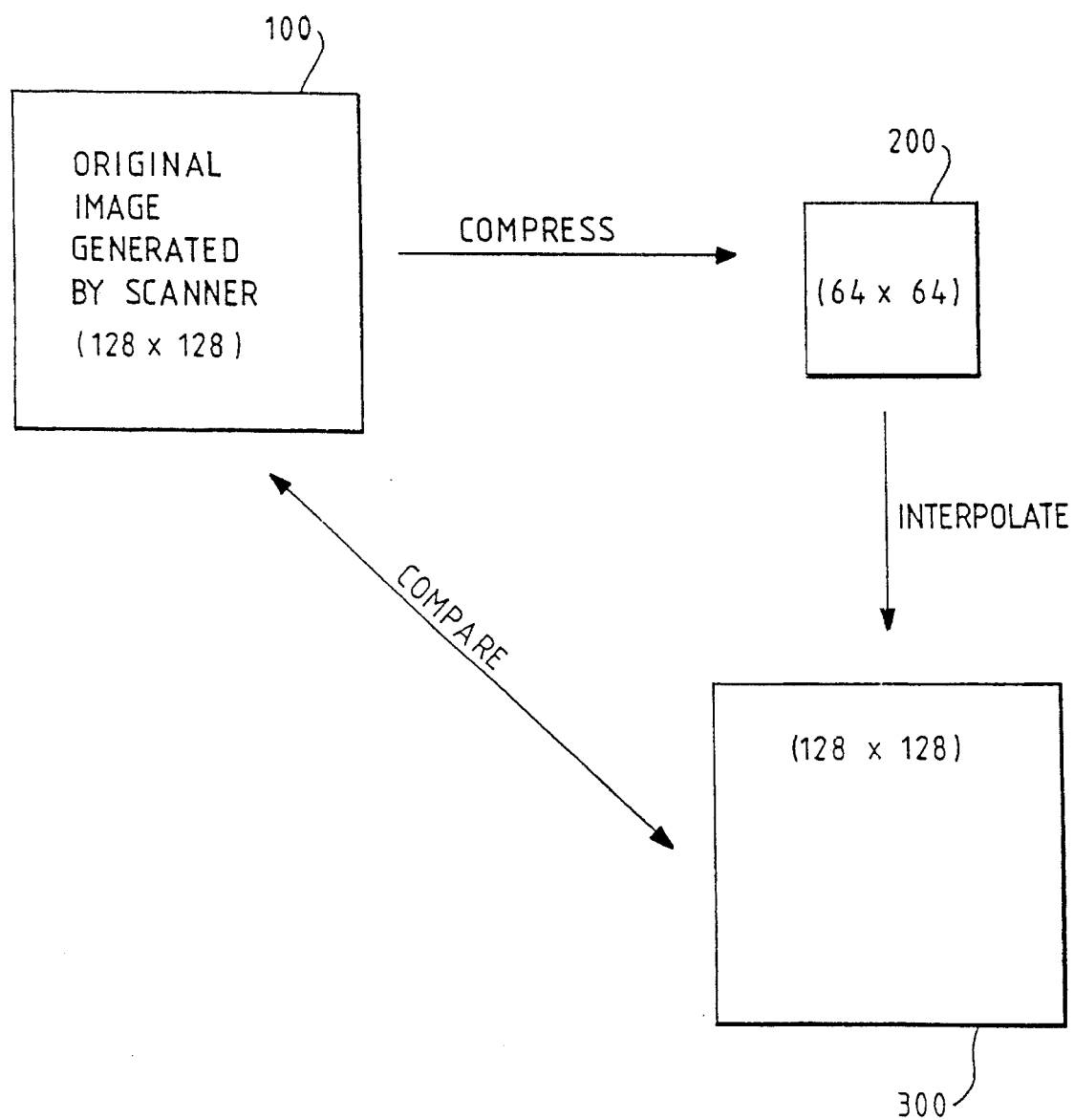
FIG. 2 illustrates a compression step carried out by a typical compression algorithm in order to generate a compressed image for storage.

In FIG. 2 a picture is read by a scanner to produce a real size image 100 of say 128×128 pixels. The compression algorithm then compresses this full size image 100 by using an averaging technique to create a 64×64 pixels image 200. Next an interpolation technique is used to generate a 128× 128 pixels image 300 from the compressed image 200. This interpolated image 300 is then compared with the original image 100 in order to generate a set of difference values defining the differences between the pixels in the true original image 100 and the corresponding pixels in the interpolated version 300 generated from the compressed image 200. In general the difference values will be small and in fact a large proportion may be zero. Thus the compressed image 200 along with the difference values can be stored much more economically than the original image 100. The compressed image can then be retrieved, interpolated in the standard manner to 128×128 pixels, and then the 128×128 image 300 can be adapted by the difference values to produce an exact copy of the original image 100.

The above description illustrates the general compression technique; in practice many such compression steps will take place so that a very compressed image will be stored along with several sets of difference values. The alphanumeric identifiers stored in association with such compressed images may include information such as confidentiality status, image quality, a unique photo number for each image, and a set of keywords to facilitate the file's retrieval at a later date. It is also possible to store several images within a particular data file; this may be advantageous if for example several images exist which relate to the same subject matter.

Typically the computer terminal which manages the database will comprise a monitor and a keyboard for user interaction and standard logic for enabling search and retrieval of files from the associated database using either photo numbers or keywords as input. In the preferred embodiment a system in accordance with the present invention will be incorporated within the computer terminal and will operate on the database search results so as to adapt them for display on the monitor.

A user wishing to retrieve a particular image or set of images may, via the terminal, either enter the photo number of the desired image, or alternatively may enter several descriptive keywords. If the user enters a specific photo number then the database will be searched and the corresponding data file retrieved. If instead the user has entered a number of descriptive keywords then the database will be searched in the usual way so as to locate all data files having one or more of those keywords associated with them.

In accordance with the preferred embodiment of the present invention the terminal then performs further operations on the retrieved files, involving scaling and positioning of the images, prior to display; this will be more fully described with reference to FIG. 1.

Figure 1:
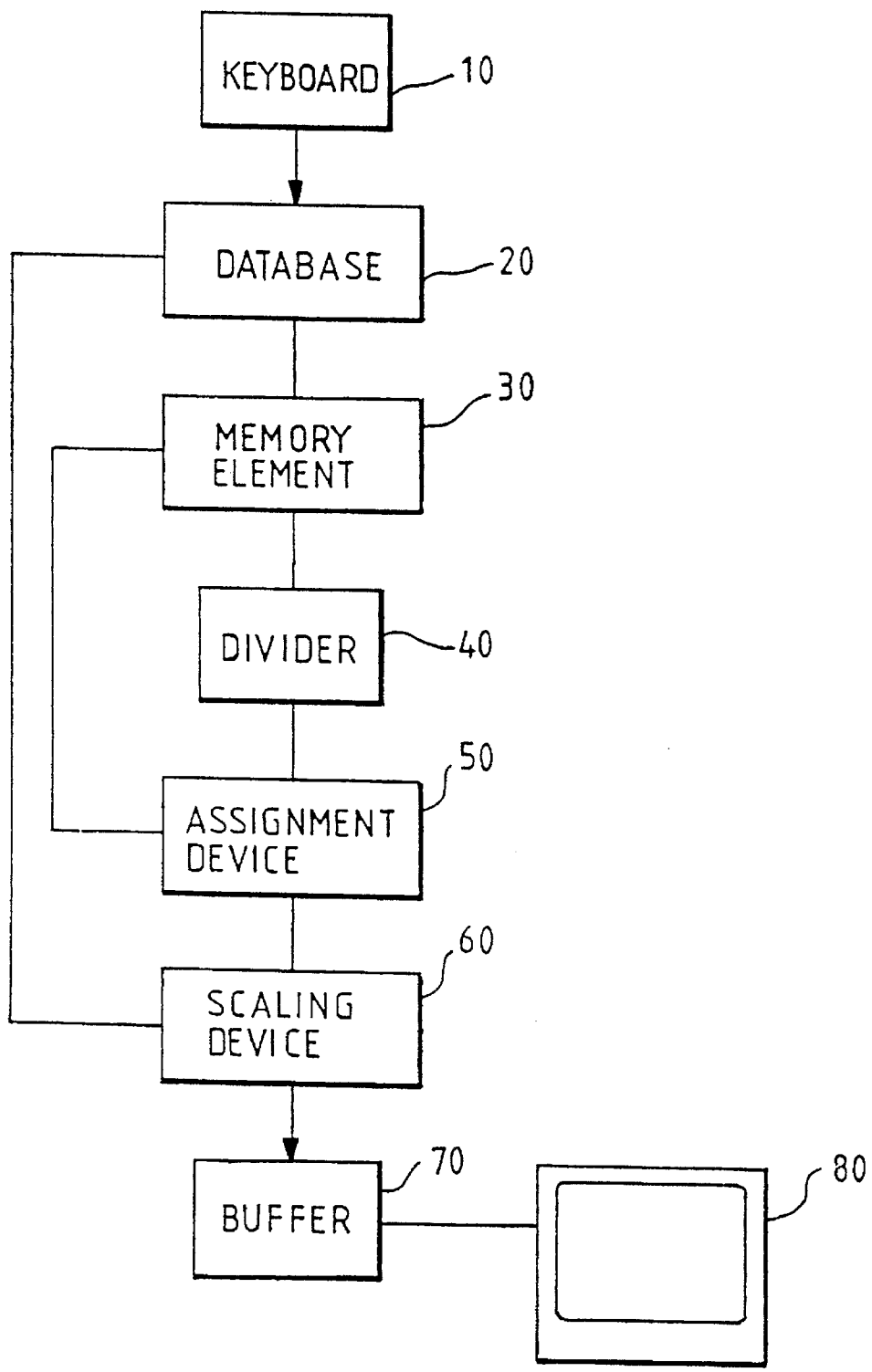
FIG. 1 shows a block diagram illustrating the arrangement of a system in accordance with the preferred embodiment of the present invention.

Referring to FIG. 1 a user enters a 'query', for example a list of search words, on a keyboard 10 which is used to search an image database 20. This results in a set of photo numbers being produced representing all those images located within the database 20 which match with the search criteria entered as said query. This set of photo numbers is then stored in a memory element 30, each photo number defining one particular image stored in the database 20. If each file only contains one image then the number of photo numbers produced is equal to the number of files located during the search. However it is possible that a file may contain several images and in this case several photo numbers may be retrieved for that one file.

The photo number information stored in the memory element 30 is then passed to a divider 40 where it is used to determine how the corresponding images will be positioned in the display area of the monitor screen 80.

Firstly the divider 40 determines the maximum number of images that can be displayed on the screen simultaneously. This maximum number would usually be taken as some predetermined number contained within storage, but could equally well be entered by the user in reply to a question prompt on the monitor screen 80. For example, if the display screen of the monitor had a display area of 1000×600 pixels, and it was observed that images of a size less than 200×200 were difficult to observe clearly, then the user could enter via the keyboard 10 that the maximum number of images desired is 15 (ie. 5×3). Hereinafter the maximum number of desired images will be referred to as "MAX-IMAGES-AT-ONCE".

The total number of photo numbers, hereinafter referred to as "IMAGES", is then determined from the photo number information received by the divider 40 from the memory element 30. If IMAGES is less than MAX-IMAGES-AT-ONCE, then the divider will simply decide to create IMAGES regions in the display area 80 of the monitor. However if IMAGES is greater than MAX-IMAGES-AT-ONCE, then the divider must apply different rules in order to divide up the display area into regions. There are several ways that this division can be performed. Firstly the divider may operate to divide the display area into a number of regions equal to MAX-IMAGES-AT-ONCE; if IMAGES is much greater than MAX-IMAGES-AT-ONCE, say for example IMAGES is equal to 50 and MAX-IMAGES-AT-ONCE has been chosen to be 8, then this approach may be the best approach. However if IMAGES is of a similar number to MAX-IMAGES-AT-ONCE, say for example IMAGES is 12 and MAX-IMAGES-AT-ONCE is 11, then this is clearly not acceptable. In this situation it would be more desirable to divide the display area 80 into 6 regions, and then if desired to divide the display area for a subsequent screen into six again for display of the remaining six images. This latter approach is the one utilized by the divider 40 of the preferred embodiment of the present invention.

Once the divider 40 has decided how many regions to create it must then decide how to divide up the display area amongst the images. In the preferred embodiment the divider 40 will create a number of regions of equal area, the areas being of similar dimensions to those of the original images stored in the database so that the images when displayed within their associated regions can retain an aspect ratio identical to the original images, whilst still occupying a large portion of their associated regions. For example, if five images are to be displayed on a screen having a display area of 400×300 pixels it would be undesirable to create five regions of 80×300 pixels if the original images have approximately a 1:1 aspect ratio. Instead in the preferred embodiment the display area would be divided into 6 regions of approximately 133×150 pixels, and one region would be left unallocated by the assignment device 50.

Although the divider 40 in the preferred embodiment creates regions of equal area, it will also be apparent to one skilled in the art that the divider may be adapted to divide the display area into unequal regions dependent on weighting factors stored in the memory element 30, together with the photo numbers, which provide information relating to the closeness of match of the images with the search criteria. For instance if one image particularly satisfies the search criteria to a greater degree than any of the others the divider could decide to create a region of greater size than the others with the intention that the assignment device 50 would then use the same information to assign that image to that large region; in this way such images would stand out to the user when displayed.

Since in the preferred embodiment the number of regions created by the divider 40 will always be less than or equal to MAX-IMAGES-AT-ONCE, and MAX-IMAGES-AT-ONCE is likely to be small, it is possible to enumerate all the numbers less than or equal to MAX-IMAGES-AT-ONCE and to define a desirable layout for each case.

For example consider the situation in which the screen size=400×300, and the minimum desirable image size=100×100; in this case the MAX-IMAGES-AT-ONCE=12. Using the layouts of the preferred embodiment in which equal area regions are created, the divider 40 can create a lookup table, as illustrated in Table I, for all possible situations and divide up the display area according to the corresponding layout for a particular number of regions to be created.

TABLE I

| IMAGES | layout | |
| --- | --- | --- |
| 1 | 1 × 1 | |
| 2 | 2 × 1 | |
| 3 | 3 × 1 | |
| 4 | 2 × 2 | |
| 5 | 3 × 2 | (1 unfilled space) |
| 6 | 3 × 2 | |
| 7 | 4 × 2 | (1 unfilled space) |
| 8 | 4 × 2 | |
| 9 | 3 × 3 | |
| 10 | 4 × 3 | (2 unfilled spaces) |

TABLE I-continued

| IMAGES | layout | |
|---|---|---|
| 11 | 4 × 3 | (1 unfilled space) |
| 12 | 4 × 3 | |

During generation of the table, checks must be performed to ensure that the minimum image size is not violated; for example if the layout for 5 images had been chosen at 5×1, then the image width would be 400/5=80 pixels. This is clearly not acceptable since the minimum image size is 100×100.

As will be apparent table I does not specify the only choice of layouts. Clearly 3×3 is also acceptable for the layout of 8 images. In the example 4×2 was chosen as it minimizes unfilled space. Similarly 2×3 is also acceptable for the layout of 6 images. In the example 3×2 was chosen as it will divide the screen into regions that are closer to squares. Table I has assumed a 1:1 screen pixel aspect ratio. This may not be the case, and corrective action may be taken in the arithmetic that generates the lookup table to account for this. It also assumes that images are equally likely to be landscape and portrait oriented. If this is not the case, then the choice of layouts can be made to bias towards tall thin spaces for portrait orientations, or short wide ones for landscape orientations. If the divider is adapted, as mentioned earlier, to be responsive to closeness of match information then such a table as above would have to be generated dynamically.

Once the number of regions, hereinafter referred to as 'n', created by the divider has been determined and an appropriate layout has been allocated this information is sent to an assignment device 50. The assignment device uses this information along with the image information from the memory element 30 in order to allocate particular photo numbers with particular regions of the divided display area. In the preferred embodiment this will involve assigning the first n photo numbers to the n regions. However if closeness of match data is available then the n photo numbers corresponding to the n images of closest match may be allocated. If as mentioned above unequal division of the display area has been performed by the divider then the assignment device 50 can also account for this and allocate the photo numbers representing images of closest match with the largest regions.

Once allocation of photo numbers has been performed this information is passed to a scaling device 60. Here the photo numbers are used in turn to retrieve the corresponding compressed image information from the database. For each compressed image, the scaling device determines the largest possible rectangle of the same aspect ratio as the image that will fit within the allocated region of the display area. This rectangle is then centralized within the allocated region, and the compressed image is enlarged so as to fill that rectangle. Any compression/decompression algorithm can be used to enlarge the image but in preferred embodiments a hierarchical compression/decompression algorithm will be used since then the display time is not directly proportional to the number of images to be displayed.

Figure 3:
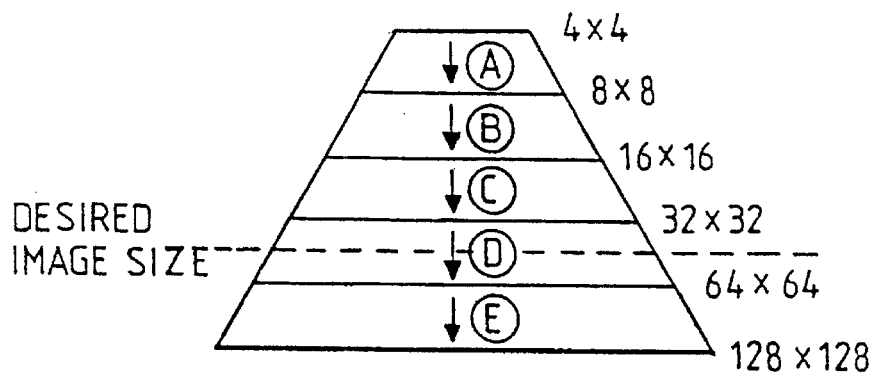
FIG. 3 illustrates how an compression/decompression algorithm based on the Burt and Adelson progressive transmission gaussian pyramid is used in the preferred embodiment of the present invention.

In particular, an algorithm based upon the progressive transmission gaussian pyramid by Burt and Adelson can be used. The way in which this algorithm is used in our embodiment is illustrated in FIG. 3. Consider the situation where it is desired to decompress a stored image so that it will fill a rectangle on said display area of 50×50 pixels. The decompression algorithm will in this situation retrieve information so as to initially create for example a 4×4 image. At expansion step 'A' interpolation is firstly employed to generate an 8×8 image and then the stored difference values are used in order to alter this image so as to give a true representation in 8×8 pixels. This process is then repeated at steps 'B', 'C', and 'D' until a true 64×64 pixels image has been formed. At this point the 64×64 image is scaled down using standard techniques to generate an image of 50×50 pixels. If it was desired to generate an image of 200×200 pixels from a stored image representing an original image of say 128×128 pixels then the Burt and Adelson decompression technique could only be used up to expansion step 'E'. At this point an exact representation of the original image will have been generated. In order to generate a 200×200 pixels image a scaling technique will have to be used in order to estimate the remaining pixels.

The above described algorithm is preferable since it allows an image to be decoded to twice the area in slightly over twice the time, and in our application this is counteracted by the fact that when you are decoding images to twice the area you are generally only decoding half the number of images. For example if five images are to be displayed instead of ten it will take approximately twice as long to create each image to fill its respective rectangle. However since you are only expanding five images instead of ten then the display time is very nearly the same as it would be for ten images. As the enlargement process is performed the values for each pixel on the display area of the monitor are written into an APA buffer 70.

In the preferred embodiment once each enlargement process is complete the corresponding expanded image will be sent from the buffer 70 to the monitor for display in the allocated region of the display area 80. Thus while the next expansion is being performed the results of the previous expansion will be displayed, subsequent images being 'tiled' to the screen in a similar fashion. Alternatively all the images allocated to the regions of the display area can be expanded and stored in the buffer 70 pixel by pixel before any information is read out to the monitor 80. In this situation the contents of the buffer 70 are read out to the monitor in a normal line by line format. However the former technique has proved to be more desirable since the user starts to receive the results of his search quicker and the tiling of subsequent images generates a smoother presentation to the user.

Figure 4:
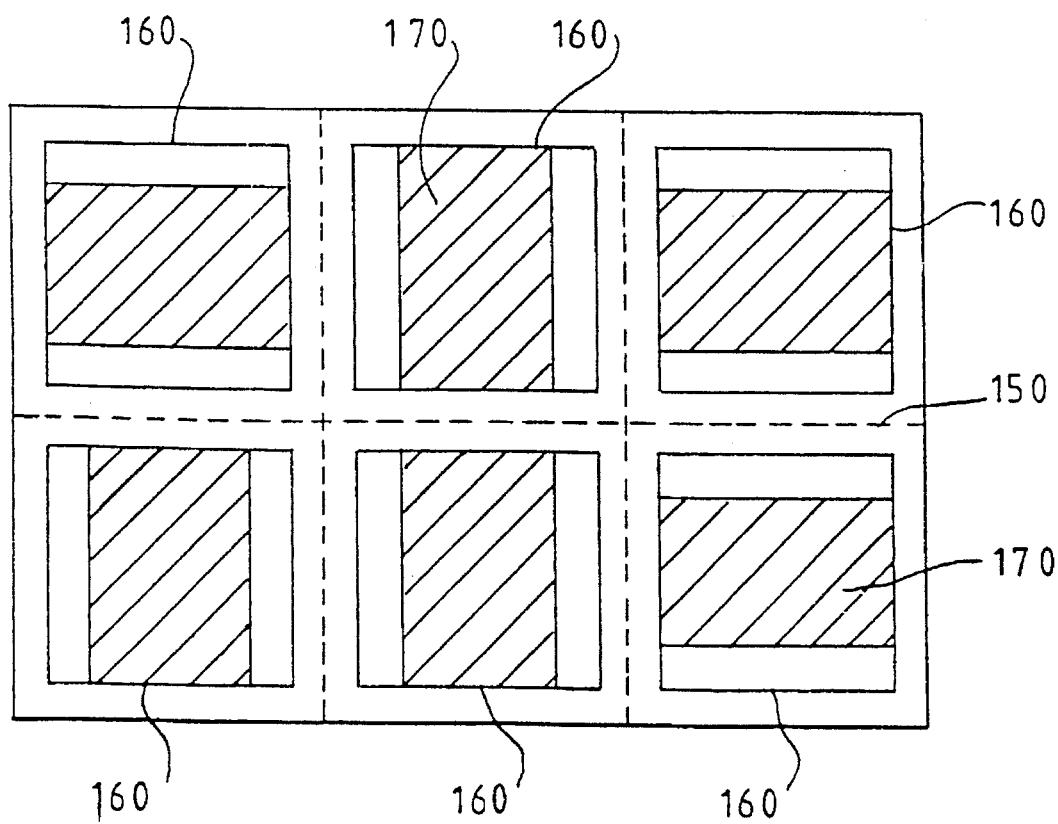
FIG. 4 shows a display screen upon which six images are displayed in 'trimmed' regions of the display.

The above description has been used to illustrate a preferred embodiment of the present invention and any quantities used therein are purely illustrative. In one implementation that has been tested MAX-IMAGES-AT-ONCE was assigned a value of 25 and a display area of 1024×768 pixels was used. Also, the scaling device 60 was adapted so as to leave a small blank border around each displayed image, thus making sure that images did not appear to join up when displayed. This was achieved by 'trimming' the edges of the allocated regions (ie. by effectively ignoring the outermost pixels of the regions) before the largest rectangle of the correct aspect ratio was calculated. This blank border was then used as a text area so that text could be displayed in the border below each image. This allows useful information such as the corresponding photo number to appear below each displayed image. FIG. 4 illustrates a display screen 80 incorporating such trimmed regions for the situation in which six images are displayed. The boundaries between the untrimmed regions are illustrated as dotted lines 150, whilst the boundaries of trimmed regions are illustrated by lines 160. The images are then reproduced in the rectangles shown by the shaded regions 170, FIG. 4 illustrating some as portrait style and some as landscape style.

Once all the images for a particular set of regions have been displayed the user can manipulate them in a variety of ways. For example the user may with a mouse and cursor select a particular image or plurality of images for further expansion. The picture numbers referring to these images will then be provided to the divider for redivision of the display area, the assignment device 50 will reassign the images to the newly created regions, and the scaling device will expand the images to fill the corresponding rectangles within the allocated regions. In this way the user can gradually reduce the number of images until he has just those that he requires left displayed. Alternatively if photo number information is supplied in the border below each image the user may, instead of using a mouse and cursor, enter the photo numbers (via the keyboard 10) corresponding to those images which he wishes to see expanded further.

If the user decides to direct his attention to just one image then he may select that this image be reproduced on the display screen along with all its associated alphanumeric identifier information. In this way the user can view, for example, the keywords that have been used to describe the image and may change any number of them if desired.

Further if IMAGES was greater than MAX-IMAGES-AT-ONCE, a message can be arranged to appear at the foot of the screen to ask whether the user wishes to see more of the search results. If the user answers yes then the process will be repeated from the dividing step performed by the divider the assignment device 50 assigning a different set of photo numbers from the search to the various regions of the screen. By repetition of this process all images from a database search can be displayed.

It will also be apparent to one skilled in the art that the expanded images as stored in the buffer 70 need not be only sent to the monitor 80, but instead may be handled in a variety of different ways. For example the contents may be sent to a printer for printing out as a hard copy, may be stored on disk for future presentation, or can be sent over a network for display at remote terminals.

We claim:

1. A system for processing data representing independently stored images so that a set of said independently stored images can be displayed on a computer display having a specified output area, comprising:

means for selecting said set of independently stored images by comparing a user provided keyword with keywords corresponding to each image;

a divider for dividing said output area into a number of regions less than or equal to a number of stored images in said set such that the size of each region is dependent upon the number of stored images, said number of regions being determined according to both a minimum image size that can be observed clearly and aspect ratios of said stored images;

an assignment device for associating each of the stored images in said set with at least one of said regions; and a scaling means for scaling each stored image from said set based on the size of each region such that a plurality of said images are concurrently displayed on said computer display and each image occupies a selected area within the associated region of said output area.

2. A system as claimed in claim 1, wherein said divider divides the output area into a number of regions exactly equal to the number of stored images in said set, said assignment device therefore associating each stored image in said set with one of said regions so that all regions are associated with an image, and said scaling means scales the stored images so that said images occupy most of their associated regions.

3. A system as claimed in claim 1 wherein said number of regions created by said divider cannot exceed a predetermined number, and if the number of stored images in said set exceeds said predetermined number, then said assignment device is adapted to assign said stored images to successive iterations of display, each such iteration containing no more than said predetermined number of regions, for representation one set at a time.

4. A system as claimed in claim 1 wherein said data representing stored images is obtained as a result of an image database search.

5. A system as claimed in claim 1 wherein said output medium is a display screen of a monitor.

6. A method of processing data representing independently stored images to enable a set of said independently stored images to be displayed on a computer display having a specified output area, comprising the steps of:

selecting said set of independently stored images by comparing a user provided keyword with keywords corresponding to each image;

dividing said output area into a number of regions less than or equal to a number of stored images in said set such that the size of each region is dependent upon the number of stored images, said number of regions being determined according to both a minimum image size that can be observed clearly and aspect ratios of said stored images;

associating each of the stored images in said set with at least one of said regions;

scaling each stored image from said set based on the size of each region such that a plurality of said images are concurrently displayed on said computer display and each image occupies a selected area within the associated regions of said output area; and transferring the scaled stored images to said computer display for concurrent display in said associated regions of said output area.

7. A method as claimed in claim 6, further comprising the steps of:

dividing the output area into a number of regions equal to the number of stored images in said set;

associating each stored image in said set with one of said regions so that all regions are associated with an image; and scaling the stored images so that said images occupy most of their associated regions.

8. A method as claimed in claim 6 wherein said number of regions created during said dividing step cannot exceed a predetermined number, and if the number of stored images in said set exceeds said predetermined number, then said associating step comprises:

assigning said stored images to successive iterations of display, each such iteration containing no more than said predetermined number of regions, for representation one set at a time.

9. A method as claimed in claim 6 wherein said data representing stored images is obtained as a result of an image database search.

10. A method as claimed in claim 6 wherein said output medium is a display screen of a monitor.

11. A system for processing data representing independently stored images so that a set of said independently stored images can be displayed on a computer display having a specified output area, comprising:

means for selecting said set of independently stored images by comparing a user provided keyword with keywords corresponding to each image;

a divider for dividing said output area into a number of regions less than or equal to a number of stored images in said set, said number of regions being dependent on aspect ratios of said stored images, one of said number of regions being larger in size indicating that said user provided keyword is a close match to one of said keywords corresponding to each image;

an assignment device for associating each of the stored images in said set with at least one of said regions, said region of larger size being associated with said image having said one of said keywords closely matching said user provided keyword; and a scaling means for scaling each stored image from said set based on the size of each region such that a plurality of said images are concurrently displayed on said computer display and each image occupies a selected area within the associated region of said output area.

* * * * *

UNITED STATES PATENT AND TRADEMARK OFFICE
CERTIFICATE OF CORRECTION

PATENT NO.   : 5,557,728
DATED        : September 17, 1996
INVENTOR(S)  : M. J. Garrett, A. Key and K. Morse It is certified that error appears in the above-indentified patent and that said Letters Patent is hereby corrected as shown below:

Title Page Patent, Appl. No., delete "543,617" insert --343,617--.

Signed and Sealed this

Twenty-second Day of July, 1997

Attest:

BRUCE LEHMAN

*Attesting Officer*    Commissioner of Patents and Trademarks